UNITED STATES PATENT OFFICE.

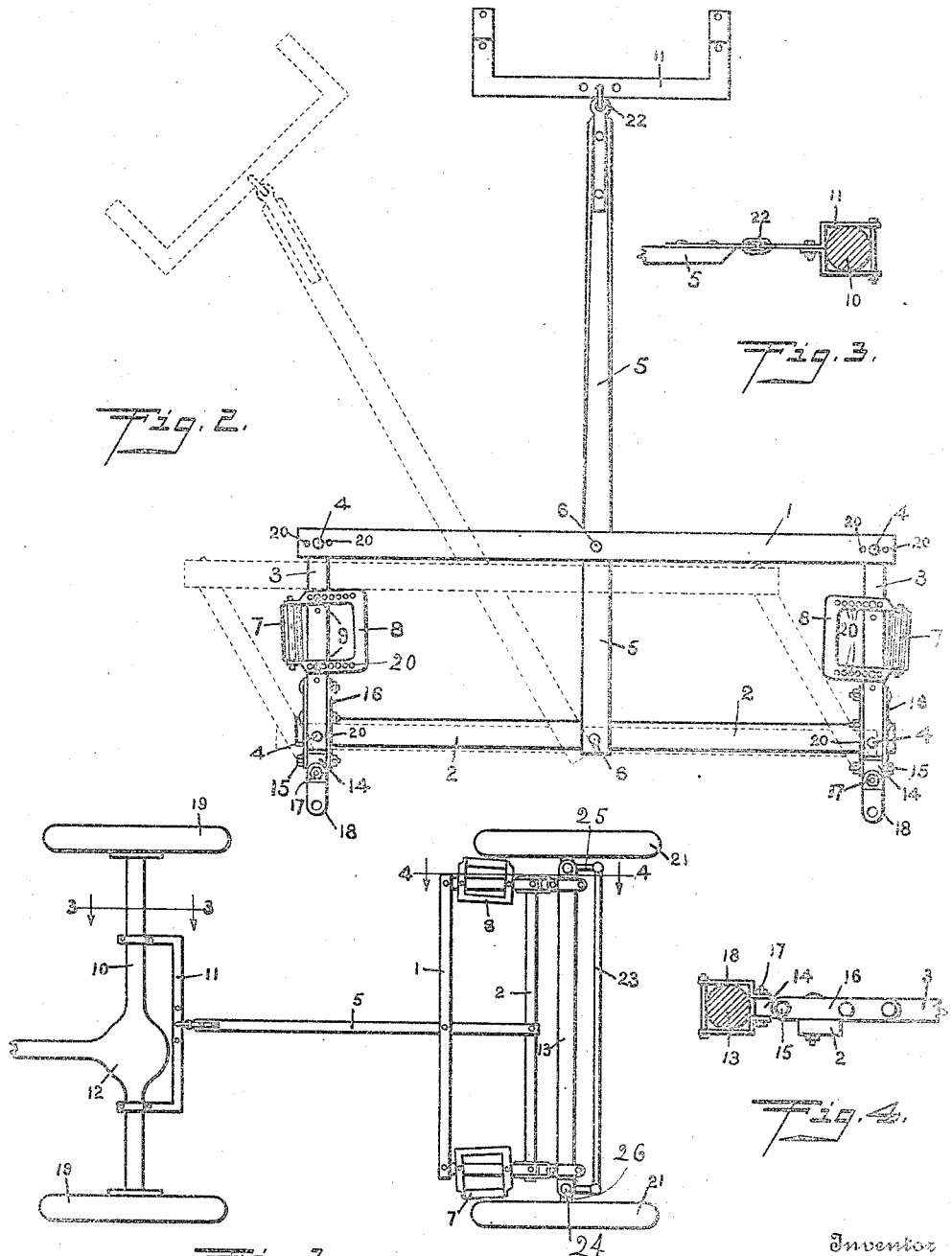

VICTOR E. PETERSON, OF OMAHA, NEBRASKA.

TRAILING APPARATUS.

1,155,437.   Specification of Letters Patent.   Patented Oct. 5, 1915.

Application filed July 13, 1914. Serial No. 850,581.

*To all whom it may concern:*

Be it known that I, VICTOR E. PETERSON, a citizen of the United States, residing at Omaha, in Douglas county, in the State of Nebraska, have invented certain new and useful Improvements in Trailing Apparatus, and have described the same in the following specification, illustrated by the accompanying drawings.

My invention relates to that class of trailing apparatus which is applicable to automobiles occasionally for the traction of the same when those vehicles are not moving under their own power.

It is the main object of the invention to connect and to hold at a suitable distance apart two automobiles, one as tractor and the other as trailer; by means of the connecting mechanism to steer the trailer in the path of its tractor; in like manner and with like effect to connect the trailer with a suitable tractor of any other description; and in general to increase the efficiency of apparatus of the specified class. To accomplish this object I incorporate in my improved trailing apparatus, as parts thereof, a tongue, or pole, for attachment to the tractor, and a linkage system or other geometrically deformable frame, attachable to the front axle of the trailer, and actuated by the pole to control the direction of the wheels of that axle.

The accompanying drawings show the best manner in which I have contemplated applying the principles of the invention; yet the latter is not restricted to any specific construction or arrangement of parts, excepting as limitations of that kind are either expressed or necessarily implied in the subjoined claims.

In these drawings Figure 1 is a plan of a trailing apparatus which is constructed in accordance with these principles and is shown in operative position connecting two automobiles, one drawing the other. Fig. 2 is an enlarged plan of the same trailing apparatus. Fig. 3 is a vertical section on the section line 3—3 of Fig. 1. Fig. 4 is a vertical section on the section line 4—4 of Fig. 1.

In this illustrative specimen of my invention, the geometrically deformable frame is a flat quadrilateral pivotally jointed linkage system comprising the parallel front and rear bars 1 and 2 and the parallel end bars 3, all conjoined by the pivot bolts 4. The forwardly projecting pole, tongue, or drawbar 5, is pivoted to the middle of the bars 1 and 2 by the bolts 6; and on each end of the frame may be mounted an outstanding guide, consisting preferably of the horizontal roller 7 carried by the clevis 8, which is adjustably secured to the end bar 3 by the screw bolts 9. In the absence of this guide, its function may be performed by the bar itself. The pole may advantageously be attached to the rear axle of the tractor automobile by the double clamp 11, which spans the differential gearing 12 and is flexibly connected with the forward end of the pole. The rear end of each of the bars 3 is attached to the front axle 13 of the trailing automobile by a double pivotal connection comprising the block 14, which has a horizontal pivot pin 15 connecting the extended side plates 16 of the bar, and has an approximately vertical pivot pin 17 connecting the jaws 18 of a clamp hugging the axle.

In applying this apparatus to an automobile which is to be drawn and steered thereby, the end bars 3 are adjusted by the use of the bolts 4 and the alternative boltholes 20, to a greater or less convenient distance apart, somewhat less than the distance between the wheels 21; while the rollers 7 are in a similar manner adjusted in closer proximity to the forward peripheral portion of those wheels respectively. As may be seen in Fig. 1 each of these rollers, viewed from above, forms a slight angle with the bar 3 on which it is mounted. These guides, as well as the pole, are floating, in the sense that being connected with each of said axles by a two-way joint, or its equivalent, they are pivotally oscillatable both laterally and vertically with reference to both vehicles, and constantly occupy a variable position determined by the movements of those axles relatively to each other.

In the operation of the apparatus, whenever the trailer attempts to deviate from the path of the tractor, and likewise whenever the tractor turns from a straight course, one of the bars 3, or the roller 7 thereon, being operated by the consequent deflection of the pole, is pressed against the tire casing of the adjacent bearing-wheel 21, and by lateral pressure thereon turns that wheel, together with its coaxial steering arm stem 26 about the vertical pivotal axis 24; and this movement of said wheel is communicated in kind and extent to the other wheel on the same axle by its coaxial steering arm stem 26, the front axle steering arms 25 and the intermediate long steering rod 23. Thereby said wheels are turned in unison in the direction and to the extent necessary to steer the trailer into the path of the tractor.

I claim as my invention:

1. A trailing apparatus of the specified class, comprising a pole for attachment to the tractor, a geometrically deformable frame attached to the front axle of the trailer, and operated by the pole to engage the wheels of that axle alternatively.

2. A trailing apparatus of the specified class, comprising a pole for attachment to the tractor, a pivotally jointed frame operated thereby and attachable to the front axle of the trailer, and a pair of guides mounted upon the frame for engagement with the wheels of that axle.

3. A trailing apparatus of the specified class, comprising a pole attachable to the tractor, and a geometrically deformable frame actuated thereby, which is adapted to be attached to the front axle of the trailer and to exert lateral pressure on the wheels of that axle.

4. A trailing apparatus of the specified class, comprising a pole for attachment to the tractor, and a geometrically deformable frame operated thereby, which is mounted upon the front axle of the trailer and is adapted to engage one of the bearing-wheels of that axle.

5. A trailing apparatus of the specified class, comprising a pole, a mechanically deformable frame actuated by the pole, a pair of guides adjustably mounted on the opposite ends of the frame, and pivotal connections for attaching the frame to the front axle of the trailer.

6. A trailing apparatus of the specified class, comprising a rigid pole, means for attaching the front end of the pole to a tractor, a deformable frame attached to the pole, pivotal connections between the frame and the trailer, and guides carried by the frame and adapted to engage or disengage the front wheels of the trailer.

7. A trailing apparatus of the specified class, comprising a flat quadrilateral deformable frame, a pole attached pivotally to the frame, guiding means mounted on the frame, means for attaching the frame to the trailer, and means for adjusting the guiding means on the frame.

8. A trailing apparatus of the specified class, comprising a floating pole, means for connecting the opposite ends of the pole with the tractor and the trailer respectively, and a floating guide actuated by the pole and in unison therewith, and adapted to engage a front wheel of the trailer.

9. A trailing apparatus of the specified class, comprising a deformable frame attached to the front axle of the trailer, a pole attached to the frame and to the tractor, and wheel-guiding means carried to and from the wheels of that axle by the relative movements of the pole and axle.

10. A trailing apparatus of the specified class, comprising a floating pole, flexibly connected with the tractor and with the front axle of the trailer, and a floating guide carried by the pole and adapted by lateral pressure to steer the wheels constantly in parallelism with the pole.

11. A trailing apparatus of the specified class, comprising a pole, a deformable jointed frame actuated by the pole, and a roller carried by the frame for occasional engagement with the front wheel of the trailer.

In testimony whereof I set my name hereto in the presence of two witnesses.

VICTOR E. PETERSON.

Witnesses:
WM. J. HOTZ,
WILLARD EDDY.

Copies of this patent may be obtained for five cents each, by addressing the "Commissioner of Patents, Washington, D. C."